Sept. 1, 1953   R. FAVRE   2,650,467
CALENDAR TIMEPIECE
Filed Nov. 15, 1950

Inventor
Robert Favre
By Michael Ss/u Agent

Patented Sept. 1, 1953

2,650,467

UNITED STATES PATENT OFFICE 2,650,467

CALENDAR TIMEPIECE

Robert Favre, Evilard-sur-Bienne, Switzerland, assignor to Marc Favre & Co. S. A., a corporation of Switzerland Application November 15, 1950, Serial No. 195,735
In Switzerland June 2, 1950

1 Claim. (Cl. 58—58)

The present invention relates to a calendar time-piece comprising a ring or rim with internal teeth and bearing the indications of the calendar.

This time-piece is characterized by an intermediate moving part which is actuated by a wheel rigidly connected to the hour wheel and which actuates a wheel controlling or operating the toothed rim or crown.

The accompanying drawing shows by way of example one embodiment of the invention and one modification thereof.

Figure 1:
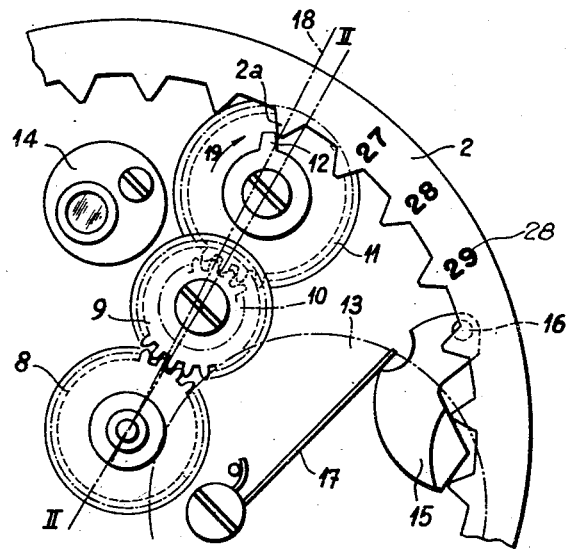
Figure 1 is a plan view on the dial side of part of a time-piece movement.
Figure 2:
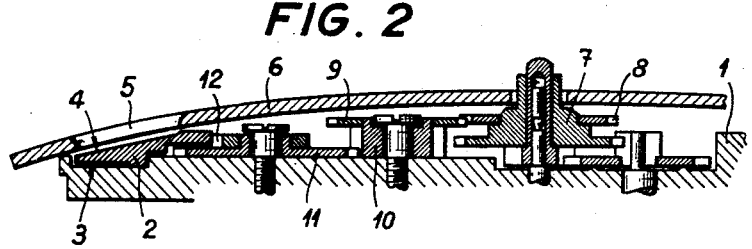
Figure 2 is a section on the line II—II in Figure 1.

The plate of the watch or clock shown is denoted by 1. An internally toothed crown or ring 2 is rotatably mounted in an annular peripheral groove 3 of the plate. This ring bears on its outer face the numbers 28 of the days of the month intended to appear in an opening 5 formed in the dial 6.

The hour wheel is designated by 7. It is rigidly connected to a wheel 8 situated above it, which actuates a wheel 9 rigidly connected to a pinion 10. The latter actuates a wheel 11 possessing a projection 12 designed to co-operate with the teeth of the ring 2 so as to displace the latter by one tooth per turn. The gear ratios are selected in such a manner that when the wheel 8 makes one turn in twelve hours, the wheel 11 will make one turn in twenty-four hours.

The interposing of the moving element 9—10 between the wheel 8 and the wheel 11 enables the diameter of the wheel 11 to be so far reduced that it becomes possible to locate this wheel 11 entirely within the thickness of the plate, for example in the space between the barrel 13, the balance plate 14 and the periphery of the movement. The toothed rim 2 can likewise be located within the thickness of the plate. Thus the thickness of the movement is reduced, particularly at the periphery, which makes possible the mounting of more elegant cases.

The toothed rim 2 is subject to the action of a pawl 15, pivoted at 16 to the plate, and pressed by a spring 17 against the teeth of the rim.

It should be observed that the centre of the wheel 11 is situated outside the line designated by 18 passing through the centre of the rim and the point of a tooth 2a thereon situated facing the wheel 11. Thus the projecting part 12 only actuates the rim 2 when the wheel 11 turns in the direction of the arrow 19. When the wheel 11 rotates in the opposite direction, the projecting part 12 displaces the tooth 2a by an amount which is insufficient for the pawl to complete this displacement, and the rim returns to its initial position. Under these conditions it is possible to displace the rim 2 by hand, without any special operating member, through the setting crown of the watch, without having to turn the hands 24 hours for each displacement of the rim. It suffices to actuate the projecting part 12 in a to-and-fro movement controlled by a to-and-fro movement of the setting.

Figure 3:
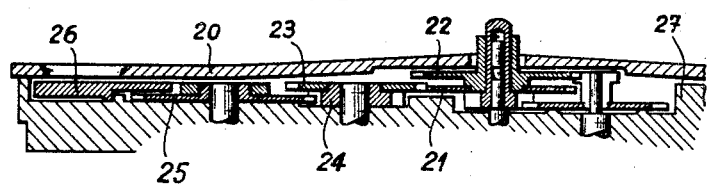
Figure 3 is a similar section of a modification.

In the modified form of Figure 3, the dial designated by 20 possesses a swelling in its central part. The wheel 21 rigidly connected with the hour wheel 22 is located beneath the latter. This wheel 21, the intermediate moving elements designated by 23—24, the wheel 25 driving the rim, and the rim itself, which is denominated by 26, are all disposed within the thickness of the plate 27.

What I claim is:

In a time-piece comprising an internally toothed rim or ring bearing the indications of the calendar and a pawl-type element ensuring a stable position of the rim after each of its displacements, an intermediate element, an hour wheel, a wheel rigidly connected with said hour wheel and actuating said intermediate element, and a wheel actuated by said intermediate element and driving the toothed rim, the centre of the last mentioned wheel being situated outside the line passing through the centre of the rim and the tip of its tooth situated facing the last mentioned wheel, so that the latter displaces the rim by one tooth in one direction of rotation and does not drive it in the other direction.

ROBERT FAVRE.

References Cited in the file of this patent

UNITED STATES PATENTS

| Number | Name | Date |
|---|---|---|
| 2,186,159 | Aeberhardt | Jan. 9, 1940 |
| 2,582,879 | Meyer | Jan. 15, 1952 |

FOREIGN PATENTS

| Number | Country | Date |
|---|---|---|
| 256,275 | Switzerland | Feb. 16, 1949 |